United States Patent Office.

CHARLES J. EAMES AND CHARLES A. SEELY, OF NEW YORK, N. Y.

Letters Patent No. 66,573, dated July 9, 1867.

IMPROVED COMPOUND FOR THE TREATMENT OF OILS FOR LUBRICATING.

*The Schedule referred to in these Letters Patent and making part of the same.*

TO ALL WHOM IT MAY CONCERN:

Be it known that we, CHARLES J. EAMES and CHARLES A. SEELY, both of the city, county, and State of New York, have invented a new and improved Compound to be used in the Preparation of Oils for Lubricating and other purposes; and we do hereby declare that the following is a full and exact description thereof.

The nature of our invention consists in making a compound which contains in a concentrated form certain substances which are known to be useful in the preparation of oils, and which said compound may be used extemporaneously and without skilled labor.

To enable others skilled in the art to make and use our invention, we proceed to describe it in detail.

Our invention is mainly founded on the fact, which we have demonstrated by repeated and careful experiments, that a small quantity of caoutchouc or India rubber dissolved in any of the ordinary oils increases their fluidity at low temperatures, while at the usual summer heat the adhesiveness or body of the oil is increased; in other words, the oil so prepared is much less liable to freeze or chill, and the adhesiveness being increased it is more easily confined to the place where it is to be used. But rubber is almost insoluble in most of the oils, while cold, which are used in the arts, and if the oils be heated so as to facilitate the solution, the rubber is injuriously changed, the mixture becomes brown or black, and is otherwise of inferior quality. By our invention, however, we prepare the rubber in such a state that it is readily mixed or dissolved in any of the known oils, and without the application of a heat which could injure either the rubber or the oil.

Our new compound is essentially and in brief a mixture of rubber, benzoline, and a fixed oil or fat. By benzoline, we mean the lightest liquid hydrocarbons distilled from petroleum or mineral oil, and under the term fixed oils or fat we include, besides the substances commonly known as such, paraffine oil and solid paraffine. We have found that the benzoline is a rapid and efficient solvent of rubber in the cold, and that with the solution so made a suitable quantity of fixed oil may readily be incorporated. The office of the benzoline is simply as a solvent, and to this the fixed oil is added in order to facilitate the introduction of the rubber solution into the oil for use. The solution of rubber or of a simple solution of rubber in the oils used in the arts is a matter of difficulty, and requires a good degree of care and skill, and always gives an inferior result. But our new compound needs only to be poured into the oil, and with a little stirring or shaking it is fit for use in its best condition.

We do not limit ourselves to any definite proportions of the ingredients of our compound for the reason that these should be varied to suit the nature of the oils to be prepared with it and the purposes to which they are applied. When the oil to be treated has a considerable solvent power over rubber, the quantity of fixed oil in our compound may be diminished, and in the contrary case it should be increased. The proportion of fixed oil and rubber to the solvent should be so great that one gallon of our compound would be sufficient for the preparation for use of twenty-five gallons of oil for lubricating or other purposes. As an example of proportions which would be useful in many cases we give the following: benzoline, one gallon; rubber, two pounds; sperm oil, one pint.

What we claim and desire to secure by Letters Patent, is—

The compound or preparation herein described for treating oils in the manner and for the purpose described.

CHARLES J. EAMES,
CHARLES A. SEELY.

Witnesses:
JOHN A. WIEDERSHEIM,
OCTAVIUS KNIGHT.